(12) United States Patent  
Price et al.

(10) Patent No.: US 6,651,056 B2
(45) Date of Patent: Nov. 18, 2003

(54) READERSHIP INFORMATION DELIVERY SYSTEM FOR ELECTRONICALLY DISTRIBUTED INVESTMENT RESEARCH

(75) Inventors: Eric S. Price, Hull, MA (US); P. Brent Delehey, Concord, MA (US); Geoffrey D. Green, Cambridge, MA (US); David J. Berube, North Attleborough, MA (US)

(73) Assignee: Thomson Information Services, Boston, MA (US)

( * ) Notice: Subject to any disclaimer, the term of this patent is extended or adjusted under 35 U.S.C. 154(b) by 0 days.

(21) Appl. No.: 09/265,733

(22) Filed: Mar. 10, 1999

(65) Prior Publication Data

US 2002/0040365 A1 Apr. 4, 2002

(Under 37 CFR 1.47)

(51) Int. Cl.[7] .................................................. G06F 17/30
(52) U.S. Cl. .................... 707/5; 707/1; 707/6; 707/3; 707/10
(58) Field of Search ................ 705/35–36, 7, 705/10; 707/10, 3, 5, 6, 1; 207/1, 5; 215/513; 715/513

(56) References Cited

U.S. PATENT DOCUMENTS

| 4,186,438 A | | 1/1980 | Benson et al. | |
|---|---|---|---|---|
| 4,768,087 A | | 8/1988 | Taub et al. | |
| 5,187,750 A | | 2/1993 | Behera | |
| 5,230,073 A | | 7/1993 | Gausmann et al. | |
| 5,287,497 A | | 2/1994 | Behera | |
| 5,301,314 A | * | 4/1994 | Gifford et al. | 707/100 |
| 5,410,598 A | | 4/1995 | Shear | |
| 5,502,637 A | * | 3/1996 | Beaulieu et al. | 364/401 |
| 5,537,586 A | * | 7/1996 | Amram et al. | |
| 5,649,013 A | | 7/1997 | Stuckey et al. | |
| 5,678,170 A | | 10/1997 | Grube et al. | |
| 5,710,889 A | * | 1/1998 | Clark et al. | 707/100 |
| 5,864,871 A | * | 1/1999 | Kitain et al. | 707/104 |
| 5,995,947 A | * | 11/1999 | Fraser et al. | 705/38 |
| 6,272,507 B1 | * | 8/2001 | Pirolli et al. | 707/513 |
| 6,393,427 B1 | * | 5/2002 | Vu et al. | 707/101 |

* cited by examiner

*Primary Examiner*—Shahid Al Alam
*Assistant Examiner*—Cam Y Truong
(74) *Attorney, Agent, or Firm*—St.Onge Steward Johnston & Reens LLC

(57) ABSTRACT

A system for delivering rankings information on readership of investment research reports is provided, which comprises the use of a plurality of readership information reports each including at least an article identification, a computer having a software program executing on it for analyzing said plurality of readership information reports such that for each unique article identification, the program counts the number of occurrences of that article identification in the readership information reports, then sorts the counts into a ranked list, a database electrically connected to the computer for receiving and storing the ranked list, and an electronic data interface for receiving requests for and transmitting the ranked list. The system can further comprise a readership information database for storing the plurality of readership reports. A method for using the same is also provided.

14 Claims, 6 Drawing Sheets

READERSHIP INFORMATION DELIVERY SYSTEM FOR ELECTRONICALLY DISTRIBUTED INVESTMENT RESEARCH

FIELD OF THE INVENTION

The invention relates to a system for electronically distributing documents. More specifically, the invention relates to a system for delivering readership information about documents that were electronically distributed through an investment research delivery system.

BACKGROUND OF THE INVENTION

Brokers and security issuers produce tens of thousands of investment research reports, sales brochures, annual reports and the like annually. These reports are carefully prepared and edited by analysts and marketers from textual and graphical information using desk top publishing systems. The completed reports are delivered not only to the brokers' branch and retail offices, but also to institutional investors. Millions of dollars are spent to prepare, print and mail these reports, yet no sufficient mechanism other than word of mouth exists for portfolio managers or institutional investors to determine readership of these reports.

Institutional investors are regularly besieged with these investment research reports—many portfolio/fund managers receive over three feet of investment research reports per week. As a result, as many as 65% of the reports are thrown out unopened, and less than 10% of the reports are ever read. The cost of report retention is also significant and may be prohibitive. To determine which reports might be most important and influential, analysts, portfolio managers and institutional investors may desire a satisfactory way to obtain documentation on how frequently portfolio managers read specific reports.

Some on-line systems keep track of readership of articles for the purpose of billing the clients who read the articles. Lexis and Westlaw are two such systems which are well known. U.S. Pat. No. 4,768,087 to Taub et al. discloses a utility that transmits educational materials and keeps track of their usage for the purpose of obtaining royalties and evaluating the teaching materials. The disadvantages to these systems is that the usage information may not be retrievable by the users of the system.

U.S. Pat. No. 5,649,013 to Stuckey et al. and U.S. Pat. No. 5,678,170 to Grube et al. both disclose method and apparatus for tracking the distribution of data for the purpose of obtaining royalties and monitoring the use of the data. Once again, the disadvantages to these systems is that the usage information may not be retrievable by the users of the system.

U.S. Pat. No. 4,186,438 and U.S. Pat. No. 5,230,073 both disclose a system for monitoring the use of files for the purpose of keeping the most frequently requested files on a partial local database. This readership information, however, may not be comprehensive, nor accessible to everyone who wishes to use it.

U.S. Pat. No. 5,502,637 to Beaulieu et al., discloses an investment research delivery system. The Beaulieu et al. system has a host that receives investment research from a plurality of brokers and broadcasts the investment research to a plurality of investors. Although the Beaulieu et al. system can provide some readership feedback to analysts, the system does not provide a readership information to portfolio managers and institutional investors. Furthermore, the Beaulieu et al. system does not provide statistical information such as what percentage of reports were read in a firm, an industry or a bond sector.

What is desired by portfolio managers, institutional investors and analysts is a way to obtain a variety of user feedback information about investment research retrieval from an investment research delivery system for the purpose of determining which reports were read more frequently and by whom.

SUMMARY OF THE INVENTION

Accordingly, an object of the present invention is to provide a system for distributing rankings information about the distribution of documents from an investment research delivery system.

It is another object of the invention to provide a system of the above that gives rankings information on the frequency that a firm's, an analyst's, or an industry's reports were read.

It is a further object of the invention to provide a system of the above that gives detailed categorical information in addition to rankings information.

It is yet another object of the invention to provide a system of the above wherein the information is obtainable over different periods of time.

It is still another object of the invention to provide a system of the above that can provide up to date categorical information or other additional information.

These objects of the invention are achieved by a system for delivering rankings information on readership of investment research reports, which comprises the use of a plurality of readership information reports each including at least an article identification, a computer having a software program executing on it for analyzing said plurality of readership information reports such that for each unique article identification, the program counts the number of occurrences of that article identification in the readership information reports, then sorts the counts into a ranked list, a database electrically connected to the computer for receiving and storing the ranked list, and an electronic data interface for receiving requests for and transmitting the ranked list. The system can further comprise a readership information database for storing the plurality of readership reports. A method for using the same is also provided.

DETAILED DESCRIPTION OF THE INVENTION

Figure 1:
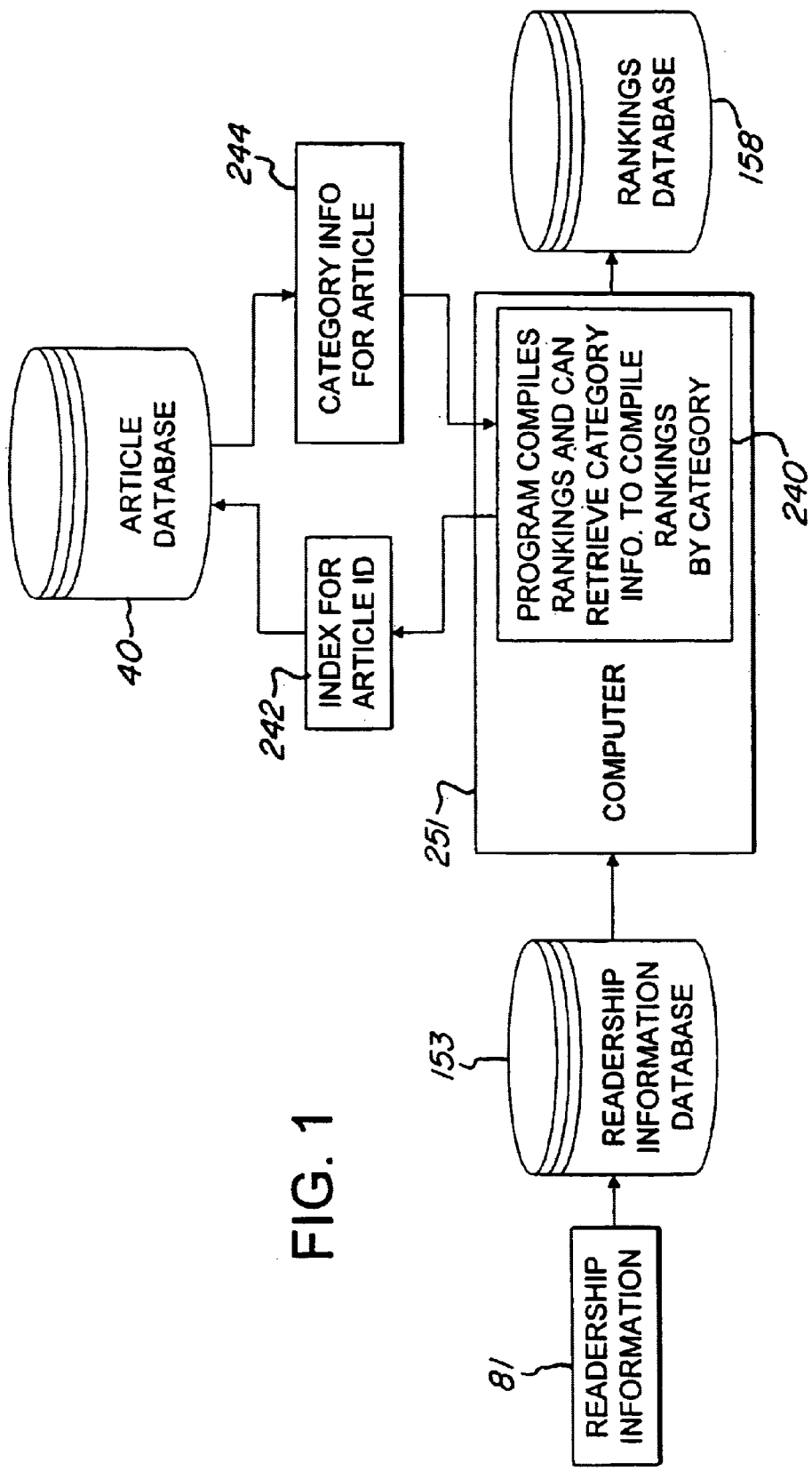
FIG. 1 is a block diagram of a readership information delivery system in accordance with the present invention.
Figure 4:
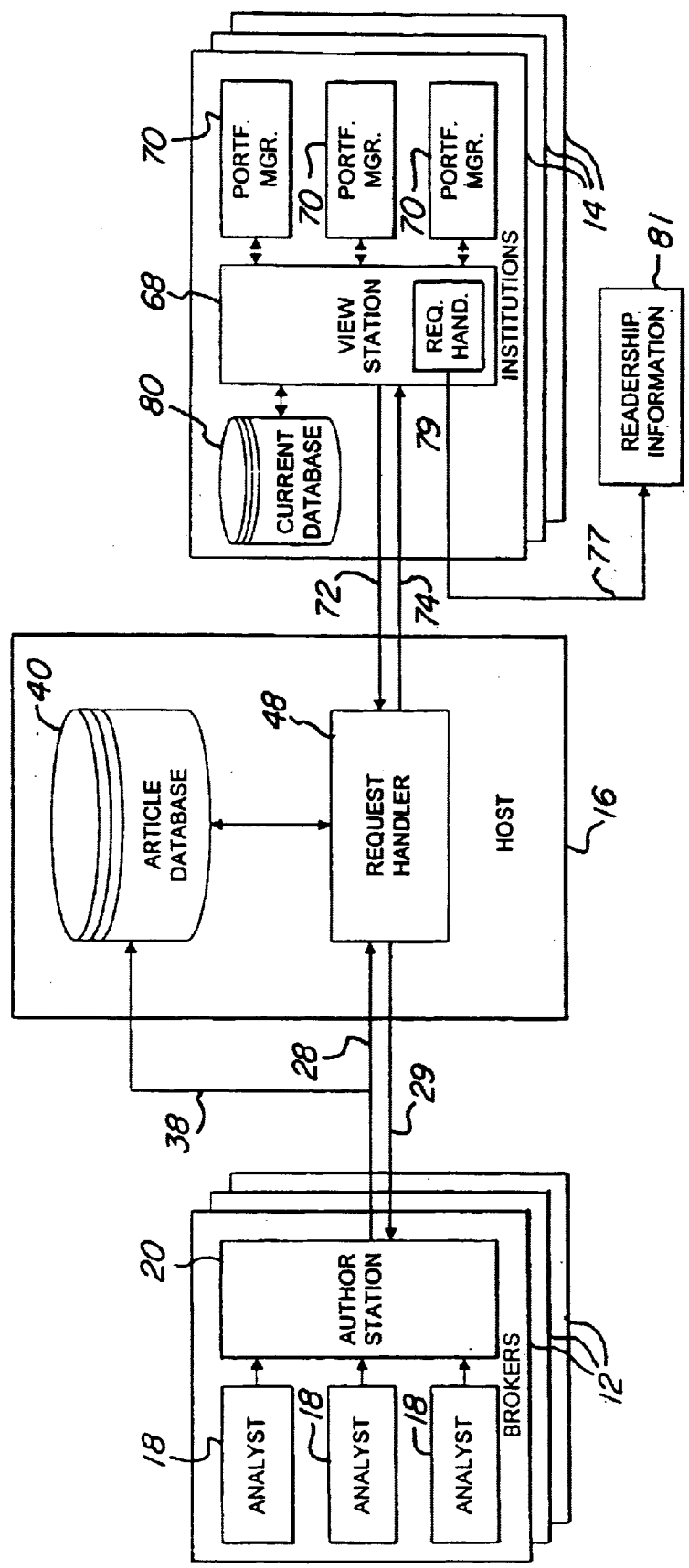
FIG. 4 is a block diagram of a readership information collection system used in conjunction with the system of FIGS. 1.

The readership information delivery system 150 in accordance with the present invention is shown in FIG. 1, which comprises a plurality of readership information reports 81, a computer 251 having a software program 240, a rankings database 158, an electronic data interface 156 over which to deliver the readership information. Additionally, the system 150 can include a readership information database 153. The readership information delivery system compiles readership information received from a research investment delivery system 10, an example of which is shown in FIG. 4, and delivers rankings information which can include detailed information.

Referring to FIG. 1, the computer 251 takes readership information 81, either from the readership information database 153 or directly from a research investment delivery system 10 (see FIG. 4), and uses a program 240 to sort the data into a ranked list based upon the number of times each article was read. The computer 251 can be a stand-alone device or can be part of a larger system that includes the readership information database 153, the rankings database 158 or the article database 40.

Using an article identification's index 242 or database address, the program 240 can also retrieve additional categorical information 244 corresponding to each article such as the headline or title of the report, the author's name, the firm the author is from, the industry of the subject and the region of the country to which the report pertains. Further additional categorical information 244 that can be added to the ranked list is the number of pages of the report, the date the report was broadcast to the portfolio manager, the date the portfolio manager read the report, and the name of the portfolio manager. This additional information can be stored on an article database 40. If the program retrieves this categorical information 244, the program 240 can compile the rankings by category. The computer 251 and program 240 can compile the rankings on a predetermined time basis, such as daily, or can compile the rankings in real time. If the rankings are compiled daily, it is preferable to complete the task at night, when the requests for rankings are less likely, due to the large amount of readership information that can be processed.

Figure 2:
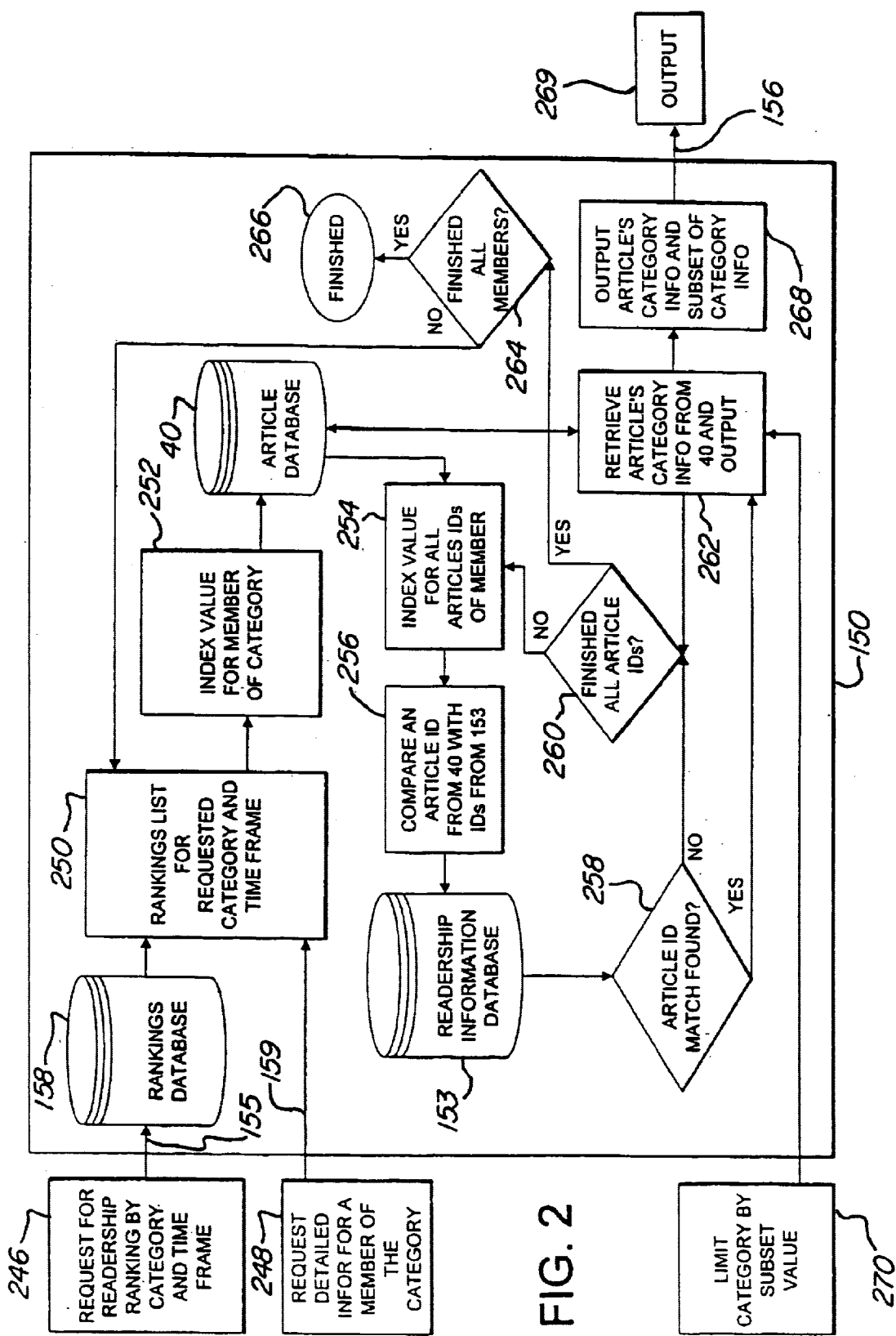
FIG. 2 is a block diagram of the distribution mechanism of the readership information delivery system of FIG. 1 wherein the system can distribute detailed information about a member of a category and can further limit a category by a subset value.

The rankings information is then transferred to the rankings database 158 for retrieval by a user as shown in FIG. 2. Once a user makes a request for rankings information 246, then the requested information is sent out over the electronic data interface 156. The electronic data interfaces 155, 159, and 156 can comprise the internet, an intranet, a web server, a site server, a communication link or a wire as defined below. Over the data interface 156, rankings information is sent to feedback stations 157 which can be located at both investor and broker locations remote from the host and may comprise a stand-alone PC or workstation, a mainframe terminal, or a network or other installation of multiple computers each of which may be available to numerous portfolio managers 70.

The readership information delivery system 150 obtains readership information 81 from a research delivery system 10 and can be delivered over line 77 shown in FIG. 4. Although a line 77 is shown for transferring the readership information, the readership information can be transferred from the research delivery system 10 to the readership information delivery system 150 in a variety of ways, such as a communication link or wire as described below, or through a portable device for transferring data. If a communication link or wire is used, the readership information delivery system 150 can poll the research delivery system 10 on a regular basis to obtain readership information.

Preferably, the readership information 81 comprises an article identification, a reader identification and a time the article was retrieved from the research investment delivery system 10. The readership information 81 obtained over line 77 can also be in the form of the research information itself or other the information concerning the delivery of the research information to customers. The readership information 81 can be obtained from a variety of places in investment research delivery system 10, such as the request handler 79, the request handler 48, the article database 40, through the investment research data interfaces 72, 74 or from another part of the investment research delivery system 10. Preferably, the readership information 81 is obtained from each request handler 79 at institutional locations 14 because these request handlers 79 have the most complete and up to date information concerning requests for articles.

It should be understood that the article database 40, the readership information database 153 and the rankings database 158 may either exist as separate databases or can be part of the same database. For instance, if the same company were to control both the investment research delivery system 10 and the readership information delivery system 150, it may be most economically feasible to have these three databases 40, 153, 158 on the same database system.

A block diagram for the distribution mechanism of the readership information delivery system 150 is shown in FIG. 2. A user makes a request for a readership ranking by a category and time frame 246 over an electronic data interface 155. These rankings are taken from the rankings database 158. The user can further make a request for detailed information about a specific member of a category 248. For instance, as shown in FIG. 6a, the user can make a request for rankings information for the category of analysts 162 and obtain rankings information about all analysts 184. The user can further specify to receive detailed information 182 about a specific analyst. The request for detailed information in FIG. 2 is shown being made over line 159 for the clarity of the block diagram, but is made over the same electronic data interface as line 156.

Upon determining a user's request, the system 150 uses a method to obtain the required information as shown in FIG. 2. If the user requested rankings information for a category, the system 150 will have to obtain all report for each member of that category, for example all analysts. If the user requested detailed information about a member of a category, the system will obtain more detailed readership information 81 for only that member, for example one analyst from the category of all analysts.

Thus, whether rankings or detailed ranking information is sought, the system uses the member index value for each necessary member of a category to obtain an article index value for all the article identifications associated for that member 254. The system compares each article identification 256 taken from the article database 40 with the readership information database 153 to determine if there is a match between the article identifications. If a match for a particular article identification is found 258, then the system retrieves the article's categorical information from the article database 40 and outputs 269 the information for that article 262 over electrical data interface 156.

The system then completes the above steps for all articles of a specific member. This can be accomplished by using a software loop that inquiries if the system is done with all article identifications for a specific member 260. Once all article identifications have been finished, the system then completes the above steps for all required member. Once again, this last step can be accomplished by using a software loop that inquiries if the system is done with all members of a category 264. If detailed information has been requested, this last step will either be unnecessary or the system will exit the software loop. The system is finished 266 when all members are finished and all the information is output over 156. The information can be sent as the system goes through the loop at 262, but the information can be stored and output all at once when it is ready.

Figure 3:
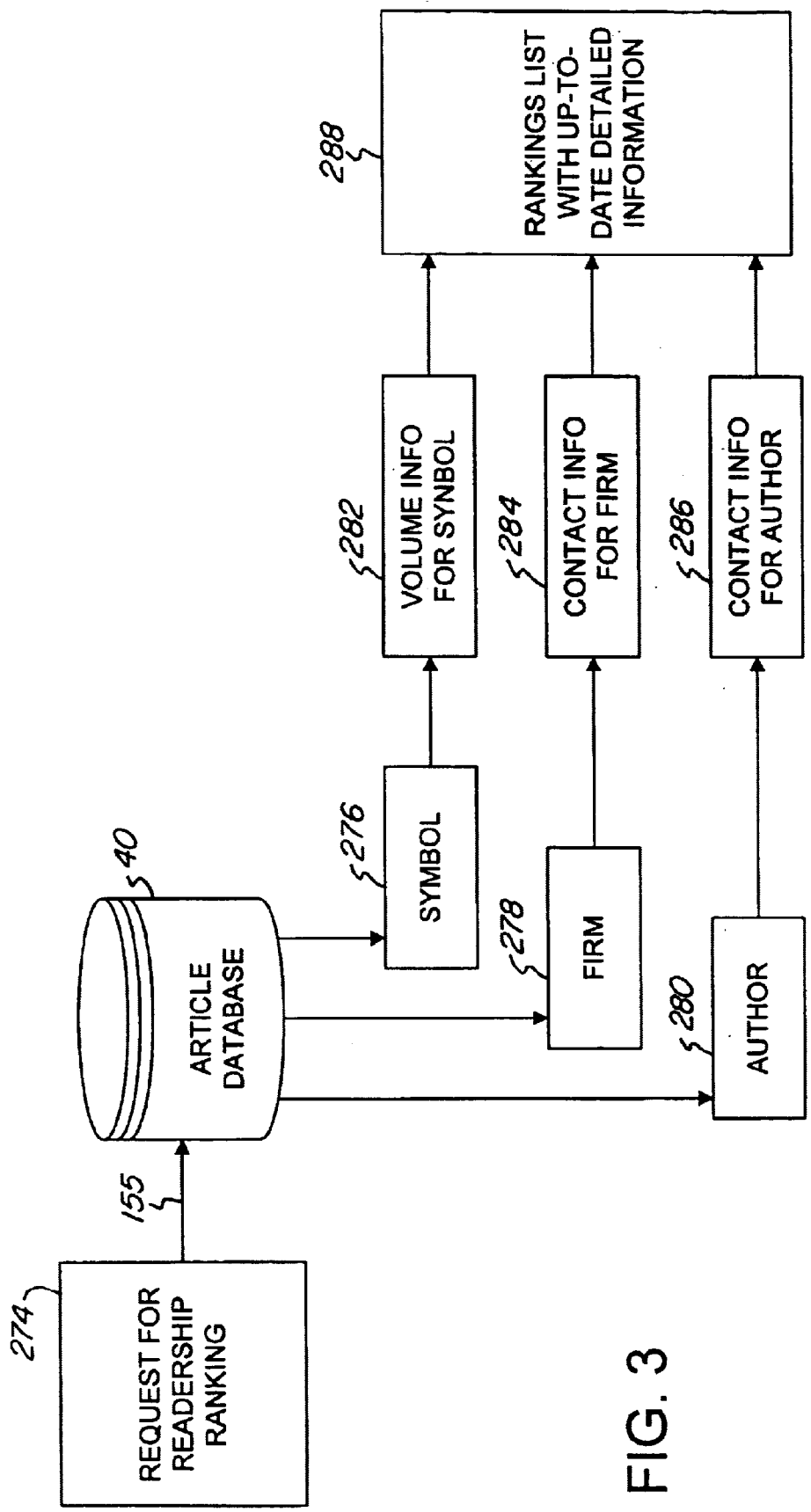
FIG. 3 is a block diagram of the readership information delivery system of FIG. 1 wherein the system can further provide up to date categorical information.
Figure 6:
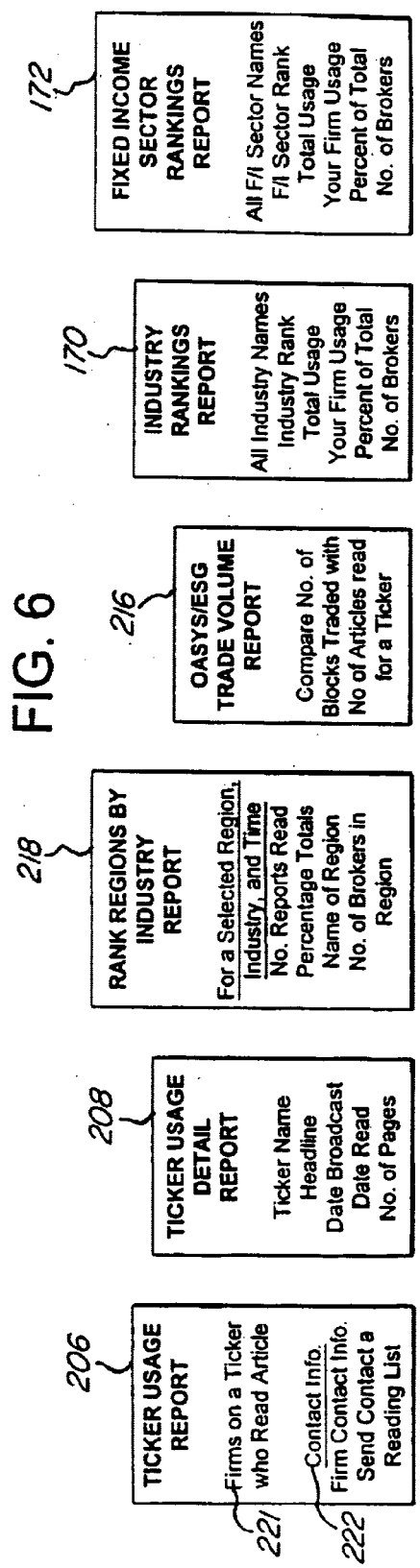
FIG. 6 is a block diagram illustrating additional reports that can be obtained from the readership information delivery system of FIG. 2.

The system can additionally limit each category or member by a subset value 270 to obtain the reports shown in FIG. 6. This subset value can be a stock ticker name, regional territory or other. For example, the ticker usage detail report 208 provides detailed report information for all reports read by the selected client. The limiting value is the stock ticker name, the category is firms and the member of the category is the firm of the system user. The system, if necessary, can provide subset value information, such as stock ticker volume information 282, as shown in FIG. 3. For example, the trade volume report 216 compares stock ticker volume information for the number of articles read for each firm. Thus, the limiting value is the stock ticker name, the category is firms and the additional information is the ticker volume information 282.

The readership information delivery system 150 allows the user to display rankings information 81 (see FIGS. 5a–c and 6) using either a web browser that the user is using or the system 150 can start a spreadsheet program to display the report. The readership information delivery system users most likely to retrieve and use the delivery system 150 will be portfolio managers 70, institutional investors and analysts 18 which may include sell side research management, sales management, general management, institutional salespersons and other salespersons.

Figure 5A:
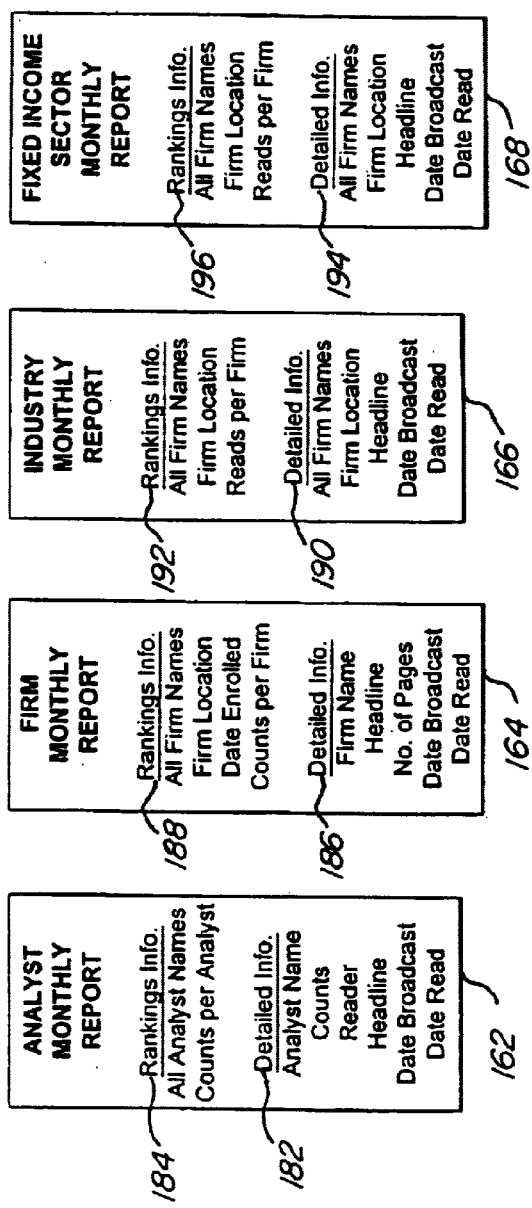
FIGS. 5a–c are block diagrams illustrating reports that can be obtained from the readership information delivery systems of FIG. 2.
Figure 5B:
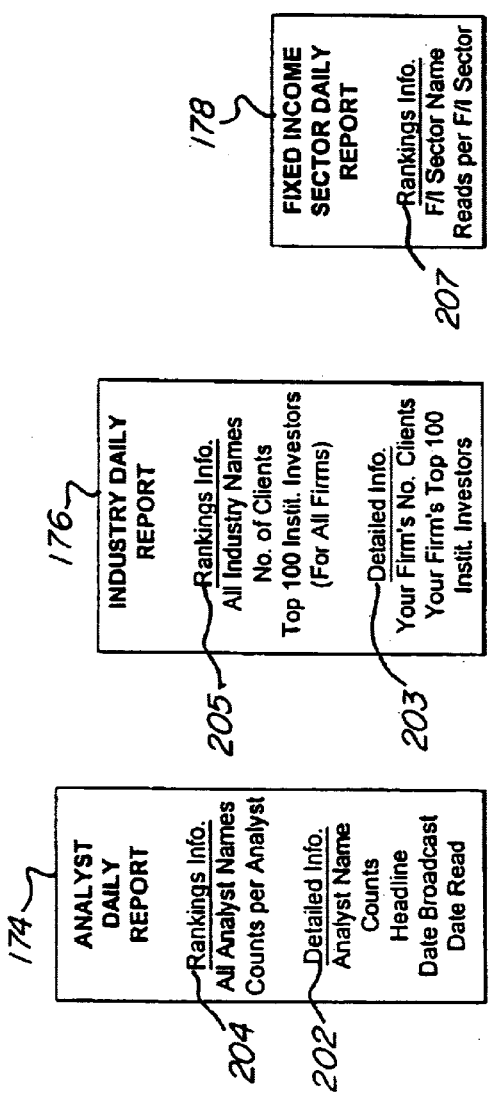
Figure 5C:
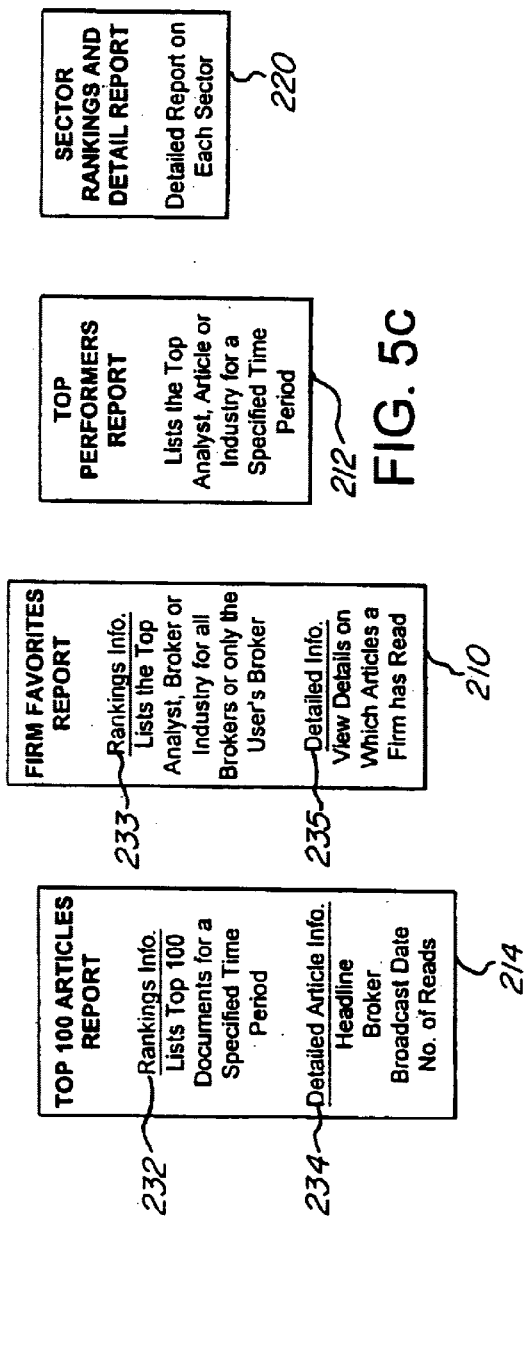

The readership information delivery system 150 has several report utilities to dispense information to a client, as shown in FIGS. 5a–c and 6. The basic reports shown in FIG. 5a–c and 6 are obtainable using the system shown in FIG. 2. The reports shown in FIG. 5a are for a monthly time basis, while those shown in FIG. 5b are for a daily time basis. The reports shown in FIG. 5c are variations of the reports from FIGS. 5a and 5b and are provided to give users flexibility in obtaining rankings information 81. The reports shown in FIG. 6 are obtainable limiting the rankings information 81 by an additional subset value, such as a region, ticker value or a ticker category.

Generally, a user begins by logging onto the readership information delivery system 150 and then selecting one of the above utilities. The user then selects a time period, such as a month, and also selects a category, such as an article, an analyst, a firm, an industry, or a fixed income sector. The user may also have the option of searching for more detailed information about the category.

Referring to FIG. 5a, the system 150 can provide reports on a monthly basis. These reports include an analyst monthly report utility 162, a firm monthly report utility 164, an industry monthly report utility 166 and a fixed income sector monthly report utility 168.

The analyst monthly report utility 162 identifies the readership information of the analysts. A user can either search for detailed information 182 on a specific analyst or view the rankings 184 information of all the analysts. The output of the detailed information 182 is sorted by the portfolio managers who read the reports, while the output of the rankings 184 information can be sorted by portfolio managers, or total counts. The detailed analyst information 182 includes the analyst's name, the headline of each report, the counts (or times) that each report was read, the name of the reader, the date the report was broadcast to the reader and the date it was read. The analyst rankings information 184 includes all the analyst names and the total counts per analyst for all reports.

The firm monthly report utility 164 generates the number of times a firm's reports were read each month. A user can either search for detailed information 186 on a specific firm or view the rankings 188 information of all the firms. The output of the detailed information 186 is sorted by the portfolio managers who read the reports, while the output of the rankings 188 information can be sorted by portfolio managers, total counts or product. The detailed firm information 186 includes the firm name, the headline of each report, the number of pages, the date the report was broadcast to the portfolio manager, the name of the portfolio manager, and the date the portfolio manager read the report. The firm rankings information 184 includes all the firm names, each firm location, the date each firm enrolled with the investment research delivery system 10, and the total counts per firm for all reports.

The industry monthly report utility 166 identifies which industries the portfolio managers are reading. A user can either search for detailed information 190 on all the firms within a specific industry or view the rankings 192 information for broader information on those firms. A user can search by month or time periods greater than 30 days. The output of the detailed information 190 is sorted by the portfolio managers who read the reports, while the output of the rankings 192 information can be sorted by portfolio managers, or total counts. The detailed industry information 190 includes for an industry the all firm names, each firm's location, the headline of each report, the date the report was broadcast and the date it was read. The industry rankings information 192 includes for an industry all the firm names, each firm's location, and the number of reads for each firm, which is the total number of counts for every report of all analysts at that firm.

The fixed income sector monthly report utility 168 identifies which sectors the bond portfolio managers are accessing. For the firms in a specific fixed income sector, a user can search for either detailed or rankings information and can search by month or time periods greater than 30 days. The detailed fixed income sector information 194 includes all the firm names within a sector, each firm's location, the headline of each report, the date the report was broadcast and the date it was read. The fixed income sector rankings information 196 includes for a sector all the firm names, each firm's location, and the number of reads for each firm, which is the total number of counts for every report of all analysts at that firm.

Referring now to FIG. 5b, the system 150 can also provide reports on a daily basis. These reports include an analyst daily report utility 174, an industry daily report utility 176 and a fixed income sector daily report utility 178.

The analyst daily report utility 174 shows which of your analysts' research reports were read by portfolio managers, as well as how many times they were read. Time periods are searchable for less than 30 days. Similar to the analyst utility 162, a user can either search for detailed information 202 on a specific analyst or view the rankings 204 information of all the analysts. The detailed analyst daily information 202 includes the analyst's name, the headline of each report, the counts that each report was read, the date the report was broadcast to the reader and the date it was read. The analyst rankings information 204 includes all the analyst names and the total counts per analyst for all reports. The analyst daily report utility 174 does not provide the names of the portfolio managers who read the reports.

The industry daily report utility 176 gives you competitive data regarding how many times all the investment research delivery clients read your reports on a given industry, in relation to the total number of times that industry was read across all contributing brokerage firms. The same comparison is shown for the top 100 institutional investor ranked buy-side institutions which use the investment research delivery system 10. The industry daily report utility 176 provides rankings information 205 including the all the industry names, the number of clients on the investment research delivery system 10 and the top 100 institutional investors of all the firms. The industry daily report utility 176 also provides detailed information 203 about your firm's number of clients and the top 100 institutional investors of your firm.

The fixed income sector daily report utility 178 gives you competitive rankings information 207 regarding how many time all bond research delivery clients read your reports on a given sector, in relation to the total number of times that sector was read across all contributing bond brokerage firms. For this utility, time periods are searchable for less than 30 days. The fixed income sector daily report utility 178 provides information including the fixed income sector name and the number of reads per fixed income sector.

Referring to FIG. 5c, the system 150 can provide variations of the reports shown in FIG. 5a and 5b. These reports include a top one hundred documents report 214, a firm favorites report 210, a top performers reports 212, and a sector rankings and detail report 220.

The top one hundred documents report 214 lists the top one hundred documents retrieved by all brokers or by the user's broker for a specified time period. The top one hundred documents report 214 also lists for each document 234 the headline, the broker, the broadcast date, and the total number of reads.

The firm favorites report 210 lists for either your broker or all brokers the top analysts, brokers, or industries by firm. The user selects which category he wishes to run the report on, which can be for an analyst, a broker, or an industry. The user then selects the report type, which is for all brokers or only the user's broker which is determined at system login. The generated firm favorites report 233 is a list of all firms requesting the user's document and the most often selected analyst, brokerage, or industry. Through a hyperlink of a firm name, the user can then view details 235 on which reports the firm has read.

The top performers report 212 lists the top analyst, document, or industry for a specified time period. The user selects the category she wishes to run the report on, which can be for an analyst, a report, or an industry. The user then selects the report type, which includes the user's broker or all brokers and the date. The generated top performers report lists the top analyst, document or industry for the specified date with details about the category selected.

The sector rankings and detail report 220 provides the ability to obtain detailed information on each sector.

Referring to FIG. 6, the readership information delivery system 150 shown in FIG. 2 can also provide the ability to limit the rankings information 81 by an additional subset value, such as a region, ticker value or a ticker category. These reports include a ticker usage report 206, a ticker usage detail report 208, a OASYS/ESG trade volume report 216, a rank-regions-by-industry report 218, an industry rankings report 170 and a fixed income sector 172 ranking report.

The ticker usage report 206 enables the client to determine who is viewing their research by selecting a ticker 221. The user first selects one of their own reports from a pull-down menu, then selects a ticker abbreviation from a second pull-down menu. The system generates a list of all firms that have viewed the user's research on that specified ticker.

From the ticker usage report 206, the user can obtain firm contact information 222. Once the user has obtained the contact information 222, the user can use hyperlinks to target the contact with a recommended reading list based on the contact's previous choices. The reading list will be sent to the contact in a daily e-mail that includes the document title and ID. The contact will have the choice to turn off the e-mail if she wishes. In addition, the user will be able to view detailed information on the documents that the firm is reading.

The ticker usage detail report 208 provides more detailed report information for all reports read by the selected client. This information includes the report headline, the date broadcast, the date read, and the number of pages in the report.

The rank-regions-by-industry report 218 allows a user to see where they stand in a particular region. The user first specifies the region, the industry and the time. The rank-regions-by-industry report 218 then lists a report of the user's rank in each industry in the region, showing the total number of reports read, the number of the users reports read, the percentage totals, the number of brokers in the region, and the name of the region.

The OASYS/ESG trade volume report 216 allows the user to compare the number of blocks traded on a particular ticker with the number of reports read on that ticker. The OASYS/ESG trade volume report lists the number of blocks traded by ticker, the specified time period, the firms who read the reports related to the ticker, the reads on the system for that ticker, the reads on the user's report, and the number of blocks traded.

The industry rankings daily report utility 170 shows the investment research delivery system's total readership standing per industry, as it compares to your brokerage firm's readership per industry. It then calculates your firm's total readership as a percentage of the system's total readership. This establishes your firm's rank in relation to the rest of the contributing brokerage firms. This report can provide data from as recent as the prior month to the current month. The industry rankings report utility 170 provides information that includes all the industry names, each industry's rank, the total usage, your firm's usage, the percent of your firm's usage to the total usage, and the number of contributing brokers.

The fixed income sector rankings report utility 172 shows the bond research delivery system's total readership standing per fixed income sector, as it compares to your brokerage firm's readership per fixed income sector. It then calculates your firm's total readership as a percentage of the system's total readership. This establishes your firm's rank in relation to the rest of the contributing brokerage firms. This report utility can provide data from as recent as the month prior to the current month. Similar to the industry rankings report utility 170, the fixed income sector rankings report utility 172 provides information that includes all the fixed income sector names, each sector's rank, the total usage, your firm's usage, the percent of your firm's usage to the total usage, and the number of contributing brokers.

The report utilities and the reports described above are described for example and are not meant to be limiting. From the above examples, it should be apparent that the readership information delivery system 150 can create and distribute a wide variety of reports by using the systems and methods described herein.

Referring to FIG. 3, a user may be able to obtain up to date categorical information for categories such as author 280, firm 278, ticker symbol 276, or for other categories. This up to date information may be stored on another database or the system 150 may poll another system for the information. An example of this is shown in FIG. 6, in which the ticker usage report 206 provides up to date firm contact information. When a user makes a request for rankings information 274, the categorical information taken from the article database 40 is updated with up to date categorical information, such as author's contact information 286, a firm's contact information 284, or the volume symbol for a ticker symbol 282. The system 150 then transmits the requested rankings list with detailed information.

Additionally, the readership information delivery system 150 may provide a broker with the option of viewing and searching his own reports. The broker can search by ticker, headline, subject, or by analyst.

The readership information delivery system 150 uses retrieval information from an investment research delivery system 10. A possible embodiment of the research delivery system 10 is shown in FIG. 4 which is described in U.S. Pat. No. 5,502,637 to Beaulieu et al., which is herein incorporated by reference. The research delivery system 10 is designed to deliver investment research generated by a plurality of brokers 12 to a plurality of institutional investors 14. In addition to brokers 12, investment research within the scope of the invention may also be generated by security issuers for purposes of reporting results, promoting sales, complying with government regulations, and the like, and by market watchers for purposes of selling subscriptions to newsletters and the like. As illustrated, investment research generated by brokers 12 is not delivered directly to institutions 14, rather it is delivered to an intermediate host 16. Host 16 then delivers the investment research to institutions 14.

By "investment research" is meant reports, memoranda, notes, promotional materials, annual reports, earnings reports, government filings, and other information concerning a particular security, security issuer, class of securities, or industry, which is generated by brokerage firms, security issuers, market watchers and others, which is relevant to an investment decision. Typically, brokers have a plurality of analysts 18, each of whom concentrates on a particular security, class of securities or industry, and periodically generates investment research concerning their area of concentration.

Analysts 18 input the investment research to an author station 20 located at the broker 12 location. Author station 20 may comprise a stand-alone personal computer (PC) or workstation, a mainframe terminal, or a LAN or other installation of multiple interconnected computers. Preferably, author station 20 is one or more PCs with the following minimum system configuration: 486/66 with 12 Mb RAM 200 Mb disk generally connected to author's LAN. It is understood that the analysts' word processing and/or desk top publishing software may, but is usually not, installed on author station 20.

Author station 20 includes software for receiving analysts' PS format research and preparing it for distribution to institutions 14 by host 16. Author station 20 also includes communication software and a modem (not shown) for transmitting the investment research files to host 16 as indicated by communication link 28. Communication link 28 is a public telephone line, however, it is understood that a dedicated or other wire, and/or wireless links may also be used. By "wire" is meant any physical connection, whether by optical fiber, coaxial cable, twisted pair or otherwise, and by "wireless" is meant cellular, microwave, IR, laser or other non-physical connection.

Investment research files are continuously received at host 16 from the plurality of author stations 20 at brokers' locations. After received by the host 16, investment research files are transferred along line 38 for storage in host database 40. Entitlement information, which is described below, is also transferred along line 38 to the host database 40.

Research received by host can be validated for the purposes of preserving and maintaining the integrity of research distributed by system 10, and to improve the usefulness and ease of using research distributed by system 10. The validation process may also conveniently be performed by the analyst at author station 20 if an original conversion from PS format to .pdf files was completed. In any event, due to time, resource and cost restraints, host 16 may elect not to perform this validation step on some of the research received from brokers 12, especially when it is known that the brokers' desk top publishing software has a sophisticated PS driver.

It is understood that host 16 may comprise a stand-alone PC or workstation, a mainframe, or a LAN or other installation of multiple interconnected computers. Preferably, host 16 is a network of Sun SPARCstation 1000 systems connected by optical fiber to an array of storage devices for data transfer at rates of 25 Mb/s full duplex.

Next, each word of the extracted ASCII are preferably indexed for searching by full text engine software available from Fulcrum of Ottawa, Canada. In addition to word searching, Fulcrum also provides the capability of field searching the contents of files having a .key format. This is accomplished by indexing the fields in addition to the words for each piece of investment research. These indices are transferred for storage to host database 40 in conjunction with the unique file name associated with the investment research file for each piece of investment research, so that identification of either index during a search will permit retrieval of the corresponding research file.

The remote storage and headline display instructions, and the headline are passed along line 72 to the appropriate view stations 68 for execution upon receipt of the corresponding investment research files for each piece of investment research. To assume prompt transmission of these instructions to view stations 68, line 72 is preferably a dedicated open channel for receipt of host 16 communications. Upon receipt of the broadcast and the entitlement instructions by view station 68, instructions are interpreted and the entitled investment research files are stored along on remote database 80 for immediate access by portfolio manager 70.

The request handler 48 compares entitlement information to an investor profile previously received from a view station 68 and stored on host database 40. By "entitlement" information is meant a broker's or analyst's list of which institution are permitted access to its investment research and which are not. The investor profile is an indication of the investment research of interest to a particular institutional investor 12 or portfolio manager 70. Comparing the entitlement information to the identity of all investors submitting profiles, request handler 48 generates instructions regarding which investors are permitted to store and access each piece of investment research and which investors are not. Also, comparing the headlines to the investor profiles, request handler 48 generates instructions regarding which headlines to display on which author stations or terminals for notifying portfolio managers of receipt of investment research of interest to the portfolio managers.

Headlines will only be displayed for notifying portfolio managers if the institution is entitled to access the research. A headline can include information identifying the research, an entitlement list for distributing the research, and the following field information used for searching archived research: broker, analyst, symbol, country, industry, region, subject, and possibly others. The remote storage and headline display instructions, and the headline are passed along line 72 to the appropriate view stations 68 for execution upon receipt of the corresponding investment research files for each piece of investment research. To assume prompt transmission of these instructions to view stations 68, line 72 is preferably a dedicated open channel for receipt of host 16 communications.

Request handler 79 at view station 68 accepts requests from portfolio managers and determines whether a requested research file is located on the current database 80 located at the institution 14. If file is not located on the current database 80, the request handler 79 transmits the request for the file over line 72 to request handler 48 at host 16. The request handler 48 then retrieves the requested file from the archived research database 40. Because the request handler 79 at view station 68 accepts all the requests from portfolio managers, it is a convenient source to obtain the readership information sent out over line 77.

Using the investment research delivery system 10, an author can receive at an author station the view, retrieve and search use information over line 29. However, this information is not compiled, sufficiently categorized or searchable as is the categorized readership information of the present invention. Furthermore, investors and portfolio managers cannot directly access this information themselves through a view station 68.

As with author stations 20, view stations 68 are located at investor locations remote from the host and may comprise a stand-alone PC or workstation, a mainframe terminal, or a network or other installation of multiple computers each of which may be available to numerous portfolio managers 70. By "institutional investor" is meant retirement and pension funds, mutual fund companies, investment advisors, insurance companies, and other investors which manage or trade for two or more accounts. By "portfolio manager" is meant a person or entity making investment decisions or providing investment advice on a particular account at an institutional investor.

The research files can be broadcast from host 16 over a dedicated satellite communication link 74 to institutions 14. A dedicated satellite is preferably used in order to provide instant worldwide communication of large quantities of data substantially continuously. It is understood that other data communication systems may be utilized such as microwave, fiber optic or coaxial and that factors such as the geographical proximity of institutions 14 with each other and host 16, the volume of data, the permissible distribution time, and the like may bear on the system selected.

In operation, a portfolio manager 70, an analyst 18 or an institutional investor will view chose to view one of the several reports from FIGS. 5a–c or 6. A portfolio manager may desire to know which analyst reports were read the most frequently by other portfolio managers 70. From this readership information, the portfolio manager may change which investment research reports he reads in the future from the investment research delivery system 10. The same change in reading choices may occur for an institutional investor. An analyst, after viewing the readership information from the readership information delivery system 150, may choose to change the content of information in his report or his style of writing.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A system for compiling and distributing information for investment research reports, comprising:
    a plurality of readership information reports;
    a computer for receiving said plurality of readership information reports, each report including an article identification and a plurality of subset values of a reader;
    a program executing on said computer for analyzing said plurality of readership information reports such that for each unique article identification, said program counts the number of occurrences of that article identification in said readership information reports;
    said program executing on said computer for analyzing said plurality of subset values such that for each unique subset value, said program counts the number of occurrences of that subset value in said plurality of subset values;
    a list of unique article identifications sorted and ranked by the number of occurrences of each unique article Identification and each unique subset value of the reader in said plurality of readership information reports;
    a database electrically connected to the computer for receiving and storing the ranked list; and
    an electronic data interface for receiving requests for the ranked list from said database for reply.

2. The system for compiling and distributing readership information according to claim 1, further comprising an article database for storing category information about the investment research reports and for providing the category information to the computer.

3. The system for compiling and distributing readership information according to claim 1, wherein each readership information report further includes a reader identification and a time an investment research report was read.

4. The system for compiling and distributing readership information according to claim 1, wherein said program counts the number of occurrences of the article identification in said readership information reports over a predetermined time period.

5. The system for delivering detailed rankings information according to claim 1, further comprising an investment research delivery system, which comprises:
    an author station at brokers' locations for rendering investment the research reports;
    a host for receiving the investment research reports;

a transmitter at the host location for broadcasting the investment research reports; and a view station at an institutional investor's location for receiving the investment research reports.

6. A method for compiling and distributing readership information on readership of investment research reports delivered from an investment research delivery system, the steps comprising:

obtaining readership information reports each having an article identification and subset value of a reader from the investment research delivery system;

counting a number of occurrences of each unique article identification and each unique subset value of the reader that appears in said readership information reports;

sorting the number of occurrences for each unique article identification into a list of unique article identifications sorted and ranked by the number of occurrences of each unique article identification in the plurality of readership information reports;

sorting the number of occurrences of each subset value;

generating statistical information and incorporating the information into the ranked list;

storing the list onto a database;

accepting a request for the list; and transmitting a copy of the list.

7. The method for compiling and distributing readership information on readership according to claim 6, wherein the step of transmitting the ranked list is done through an internet web server.

8. The method for compiling and distributing readership information on readership according to claim 6, wherein the step of obtaining readership information reports comprises polling for readership information reports, each having an article identification, from an investment research web server.

9. The method for compiling and distributing readership information on readership according to claim 6, wherein the step of obtaining readership information reports comprises polling for readership information reports, each having an article identification, from an investment research site server.

10. The method for compiling and distributing readership information on readership according to claim 6, wherein a second identification exists for each readership information report, further comprising:

obtaining for each readership information report the second identification;

counting a number of occurrences of each unique second identification obtained for the readership information reports;

sorting the number of occurrences for each unique second identification into a second ranked list;

storing the second ranked list onto a database;

accepting a request for the second ranked list; and transmitting a copy of the second ranked list.

11. The method for compiling and distributing readership information on readership according to claim 10, wherein the second identification is an author identification.

12. The method for compiling and distributing readership information on readership according to claim 10, wherein the second identification is an industry identification.

13. The method for compiling and distributing readership information on readership according to claim 10, wherein the second identification is a firm identification.

14. The method for compiling and distributing readership information on readership according to claim 9, wherein the second identification is a ticker identification.

* * * * *